(12) United States Patent
Zhang et al.

(10) Patent No.: US 12,031,277 B2
(45) Date of Patent: Jul. 9, 2024

(54) PAVEMENT ANTI-SKID PERFORMANCE EVALUATION METHOD AND DEVICE BASED ON ENVELOPE FEATURE

(71) Applicant: Chang'an University, Xi'an (CN)

(72) Inventors: Jiupeng Zhang, Xi'an (CN); Guojing Huang, Xi'an (CN); Fucheng Guo, Xi'an (CN); Zhe Hu, Xi'an (CN); Zhenxing Niu, Xi'an (CN); Yinzhang He, Xi'an (CN); Jianzhong Pei, Xi'an (CN); Rui Li, Xi'an (CN)

(73) Assignee: Chang'an University, Xi'an (CN)

( * ) Notice: Subject to any disclaimer, the term of this patent is extended or adjusted under 35 U.S.C. 154(b) by 0 days.

(21) Appl. No.: 18/423,175

(22) Filed: Jan. 25, 2024

(65) Prior Publication Data

US 2024/0158997 A1    May 16, 2024

Related U.S. Application Data

(63) Continuation of application No. PCT/CN2023/102572, filed on Jun. 27, 2023.

(30) Foreign Application Priority Data

Jul. 12, 2022 (CN) .......................... 202210853845.X

(51) Int. Cl.
*E01C 11/24* (2006.01)
*G06T 7/20* (2017.01)
*G06T 7/40* (2017.01)

(52) U.S. Cl.
CPC .............. *E01C 11/24* (2013.01); *G06T 7/20* (2013.01); *G06T 7/40* (2013.01); *G06T 2207/30241* (2013.01)

(58) Field of Classification Search
CPC . E01C 11/24; B60W 2552/40; B60W 40/068; B60W 2420/403; B60W 40/06;
(Continued)

(56) References Cited

U.S. PATENT DOCUMENTS

2019/0362510 A1    11/2019    Sun

FOREIGN PATENT DOCUMENTS

| CN | 102864727 A | 1/2013 |
| CN | 112818563 A | 5/2021 |

(Continued)

OTHER PUBLICATIONS

Guo F, Pei J, Zhang J, Li R, Zhou B, Chen Z. Study on the skid resistance of asphalt pavement: A state-of-the-art review and future prospective. Construction and Building Materials. Oct. 11, 2021;303:124411 (Year: 2021).*

(Continued)

*Primary Examiner* — Xiao M Wu
*Assistant Examiner* — Scott E Sonners

(57) ABSTRACT

A pavement anti-skid performance evaluation method based on envelope feature is provided. A surface profile image of a to-be-tested piece is acquired as a blank background image. A motion trajectory image of a sliding piece on the to-be-tested piece is acquired. The blank background image is treated to obtain a surface texture profile curve of the to-be-tested piece. The motion trajectory image is differenced with the blank background image to obtain a difference image, which is treated to obtain a trajectory envelope curve of motion of the sliding piece on the to-be-tested piece. An arithmetic mean of the trajectory envelope curve and an arithmetic mean of the surface texture profile curve are calculated, and the anti-skid performance is evaluated based on a height difference Δh between above two arith- (Continued)

metic means. A pavement anti-skid performance evaluation device based on envelope feature is also provided.

10 Claims, 7 Drawing Sheets

(58) Field of Classification Search
CPC ......... B60W 30/18172; B60W 40/064; B60W 2520/26; G06V 20/56; G06V 20/588; B60T 2210/12; B60T 8/172; B60T 8/175; B60T 8/1764; B60T 2210/124; B60T 8/1763; B60T 2210/13; B60T 2270/208; B60T 8/176; B60T 2230/02; B60T 2230/00; B60T 2210/14; B60T 8/17552; G06T 2207/30252; G06T 7/20; G06T 7/70; G06T 2207/30261; G06T 2207/30196; G06T 2207/30236; G06T 2207/30256; G06T 7/00; G06T 7/246; G06T 2207/10032; G06T 7/11; G06T 7/41; G06T 2207/30232; G06T 7/73; G06T 2207/30241; G06T 2215/16; G06T 7/75; G06T 2207/10016; G06T 7/12; G06T 7/248

See application file for complete search history.

(56) References Cited

FOREIGN PATENT DOCUMENTS

| | | |
|---|---|---|
| CN | 113984648 A | 1/2022 |
| CN | 115238490 A | 10/2022 |

OTHER PUBLICATIONS

Maoping RAN, "Asphalt Pavement Texture Characterization and Road Performance Study Based on Enveloped Profile", China Doctoral Dissertation Full Text Database Engineering Science and Technology II, Aug. 15, 2020, pp. C034-C035.

\* cited by examiner

PAVEMENT ANTI-SKID PERFORMANCE EVALUATION METHOD AND DEVICE BASED ON ENVELOPE FEATURE

CROSS-REFERENCE TO RELATED APPLICATIONS

This application is a continuation of International Patent Application No. PCT/CN2023/102572, filed on Jun. 27, 2023, which claims the benefit of priority from Chinese Patent Application No. 202210853845.X, filed on Jul. 12, 2022. The content of the aforementioned application, including any intervening amendments made thereto, is incorporated herein by reference in its entirety.

TECHNICAL FIELD

This application relates to pavement anti-skid performance detection, and more particularly to a pavement anti-skid performance evaluation method and device based on envelope feature.

BACKGROUND

The pavement anti-skid performance is closely correlated with the vehicle driving safety, and the insufficiency of pavement anti-skid ability is also an important factor leading to frequent traffic accidents. Generally, the pavement anti-skid performance is closely related to macro and micro textures of the pavement. Under the condition of high running speed and wet pavement, the anti-skid performance is mainly associated with the pavement macro texture, while under low-speed conditions, the pavement micro texture plays a dominant role in affecting the anti-skid performance. Therefore, the pavement texture depth has been extensively used as an important pavement texture indicator in the evaluation of the pavement anti-skid performance. However, regarding the current index evaluation strategy, only a series of different pavement texture features are measured. It is well known that friction refers to a complex contact feature between the tire rubber and the pavement under different conditions, which is related to many factors, such as pavement materials, dimensional parameters, texture features, load, pressure information, operating modes and environmental factors, etc. In addition, the specific quantitative relationship between the pavement texture range and friction contribution still remains unclear. It is obvious that the traditional testing method adopting simple pavement texture feature indicators to describe the friction behavior between the tire and the pavement still has the following problems: large human interference, low test efficiency, and poor correlation between anti-skid performance evaluation indexes and pavement anti-skid performance, thus leading to poor evaluation accuracy and reliability.

SUMMARY

An object of the disclosure is to provide a pavement anti-skid performance evaluation method and device based on envelope feature to overcome the technical problems of low testing efficiency and poor accuracy in the prior art. This application has excellent correlation, high processing efficiency, and accurate and reliable evaluation, thereby effectively enhancing the driving safety.

In order to achieve the above object, the following technical solutions are adopted.

In a first aspect, this application provides a pavement anti-skid performance evaluation method based on envelope feature, comprising:

step (1) acquiring a surface profile image of a to-be-tested piece as a blank background image;

step (2) acquiring a motion trajectory image of a sliding piece on the to-be-tested piece;

step (3) subjecting the blank background image to grayscale transformation, filter denoising and binarization processing in sequence to obtain a black-white binary background image, and extracting edge pixel information of a surface texture profile of the to-be-tested piece from the black-white binary background image to obtain a surface texture profile curve of the to-be-tested piece;

step (4) differencing the motion trajectory image in step (2) with the blank background image in step (1) with status information of the to-be-tested piece retained to obtain a difference image, subjecting the difference image to grayscale transformation, noise reduction and threshold segmentation to obtain a plurality of motion images of the sliding piece on the to-be-tested piece, extracting lowest point information of the sliding piece from each of the plurality of motion images, and subjecting the lowest point information of the sliding piece in each of the plurality of motion images to trajectory fitting to obtain a fitting curve as a trajectory envelope curve of motion of the sliding piece on the to-be-tested piece; and step (5) calculating an arithmetic mean of the trajectory envelope curve in step (4) and an arithmetic mean of the surface texture profile curve in step (3), defining a height difference between the arithmetic mean of the trajectory envelope curve and the arithmetic mean of the surface texture profile curve as an anti-skid performance index $\Delta h$ of the to-be-tested piece, and evaluating an anti-skid performance between the sliding piece and the to-be-tested piece based on $\Delta h$.

In some embodiments, the steps (3)-(5) are all completed through Matrix Laboratory (MATLAB).

In some embodiments, the sliding piece is a rubber slider or a tire, and the to-be-tested piece is a pavement or a friction test piece.

In some embodiments, in step (5), the smaller a $\Delta h$ value, the better an anti-skid performance of the to-be-tested piece, and the larger the $\Delta h$ value, the worse the anti-skid performance of the to-be-tested piece.

In a second aspect, this application provides a device for implementing the pavement anti-skid performance evaluation method, comprising a base plate, a friction test piece, a rubber slider, a camera, a fixing fixture and a pendulum friction tester; wherein the fixing fixture is provided on the base plate; the friction test piece is provided on the fixing fixture; the pendulum friction tester is provided above the fixing fixture, and is connected to the base plate; the rubber slider is provided on the pendulum friction tester, and is configured to slide on the friction test piece; and the camera is connected to the base plate, and is located in front of the pendulum friction tester.

In some embodiments, the device further comprises a fill light provided on the base plate; wherein the fill light is located between the camera and the pendulum friction tester.

In some embodiments, the device further comprises a lifting structure connected to the base plate; wherein the lifting structure comprises a lifting platform and a lifting knob; the lifting platform is connected to the base plate through the lifting knob, and is configured to move up and down along a vertical direction of the base plate; and the camera is provided on the lifting platform.

In some embodiments, the device further comprises a computer connected to the camera.

In some embodiments, the device further comprises a pad; wherein the pad is provided on the base plate; and a leveling knob is provided on the pad, and is connected to the pendulum friction tester.

In a third aspect, this application provides a device for implementing the pavement anti-skid performance evaluation method, comprising a camera, a fill light, a tire, a pavement and a sideway force coefficient test vehicle; wherein the sideway force coefficient test vehicle is provided on the pavement; the camera, the fill light and the tire are provided on the sideway force coefficient test vehicle; and the camera and the fill light are both directly opposite to a wheel hub side of the tire.

Compared with the prior art, this disclosure has the following advantages.

1. The evaluation index proposed by this application reflects the changes in a contact area under different conditions by characterizing an approach and separation process of two contact surfaces (i.e., a pavement surface and a tire surface), which has an excellent correlation with pavement friction performance, thereby more accurately characterizing the anti-skid performance of a tire rubber on the pavement.
2. Compared with a traditional anti-skid performance detection method based on pavement texture, an influence of external factors such as contact surface features, load, temperature and humidity, etc. on the anti-skid performance is taken into account in this application, and variable features of tire-pavement contact under different conditions can be characterized through a test method provided herein.
3. In this application, the motion images of the pavement and the tire during rolling are acquired by the camera, image texture information is extracted and treated to obtain the pavement texture contour curve and the envelope curve during a tire sliding process, so as to achieve anti-skid performance evaluation and prediction. This facilitates easy operation, high processing efficiency and accurate evaluation, thus more effectively ensuring driving safety.
4. In this application, the evaluation of the pavement anti-skid performance is realized through two different testing devices, which facilitates flexible and simple application, simple operation process, the reduction of the impact of human factors, low testing consumption and high testing efficiency.

Figure 1:
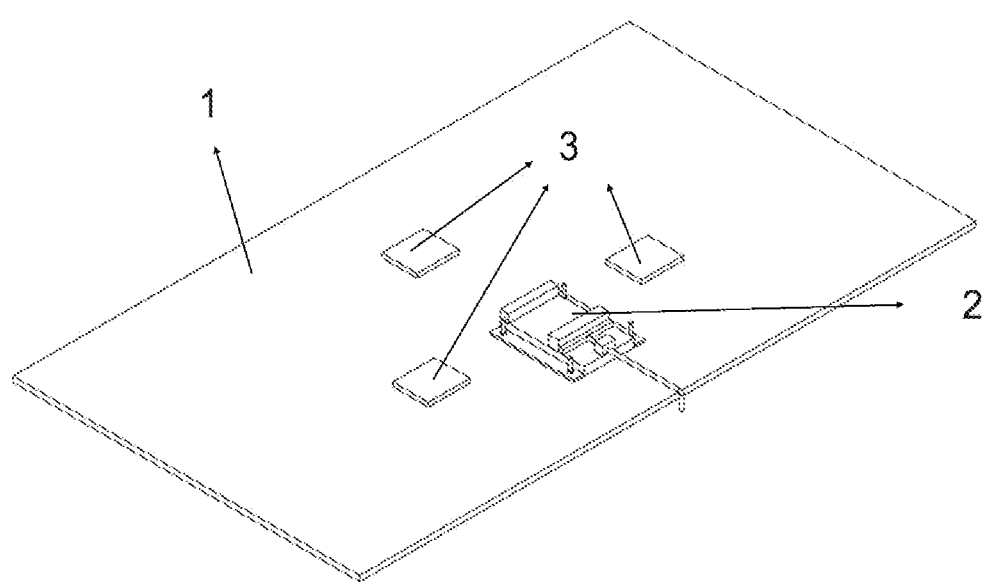
FIG. 1 is a schematic diagram of a base plate in accordance with an embodiment of the present disclosure.

In the drawings: 1—base plate; 2—fixing fixture; 3—pad; 4—pendulum friction tester; 5—friction test piece; 6—fill light; 7—fixing screw; 8—camera; 9—lifting platform; 10—lifting knob; 11—leveling knob; 12—rubber slider; 13—computer; 14—pavement; and 15—tire.

DETAILED DESCRIPTION OF EMBODIMENTS

The technical solutions in the embodiments of the present disclosure will be clearly and completely described below with reference to the accompanying drawings of the present disclosure. Obviously, provided herein are merely some of the embodiments of the disclosure, instead of all of the embodiments. Based on the embodiments provided herein, all other embodiments obtained by those of ordinary skill in the art without making creative efforts shall fall within the scope of the disclosure defined by the appended claims.

It has been shown that the tire-pavement contact area is closely related to the pavement anti-skid performance, and the larger the contact area, the better the anti-skid performance. The change in the tire-pavement contact area under different conditions actually refers to an approach and separation process of two contact surfaces (i.e., the pavement and the tire surface).

Simply, the pavement surface can be characterized by a texture profile curve, and the tire surface can be characterized by an envelope curve during rolling. Since a comprehensive characterization index of contact features of the two contact surfaces will be changed with different contact surfaces, load, operating mode, and environmental factors, a contact characteristic index between a tire envelope curve and a pavement texture curve can be adopted to achieve the variable characterization of the pavement anti-skid performance, which is more accurate and scientific than the evaluation methods and indicators in the prior art. Therefore, a pavement anti-skid performance evaluation method and device based on tire envelope feature are proposed herein.

The evaluation method in the present disclosure is designed based on a relative relationship between the tire envelope curve and the pavement texture curve to characterize the pavement anti-skid performance. Specifically, a motion image of the tire on the pavement is collected, and the influence of noise texture and other apparent features is eliminated, such that pavement texture information and tire envelope feature information can be extracted, and a correlation model between image texture parameters and pavement anti-skid indicators is built, thereby achieving the anti-skid performance evaluation and prediction based on tire envelope feature.

An anti-skid performance testing method provided herein can be used to evaluate the anti-skid performance of a rubber slider and a test piece based on a pendulum friction tester, or can be used to evaluate the anti-skid performance of an outdoor regular pavement cross section based on a sideway force coefficient (SFC) test vehicle. This application will be described in further detail below with reference to the accompanying drawings and embodiments to make the above objects, features and advantages of this application more obvious and understandable.

Embodiment 1

Figure 2:
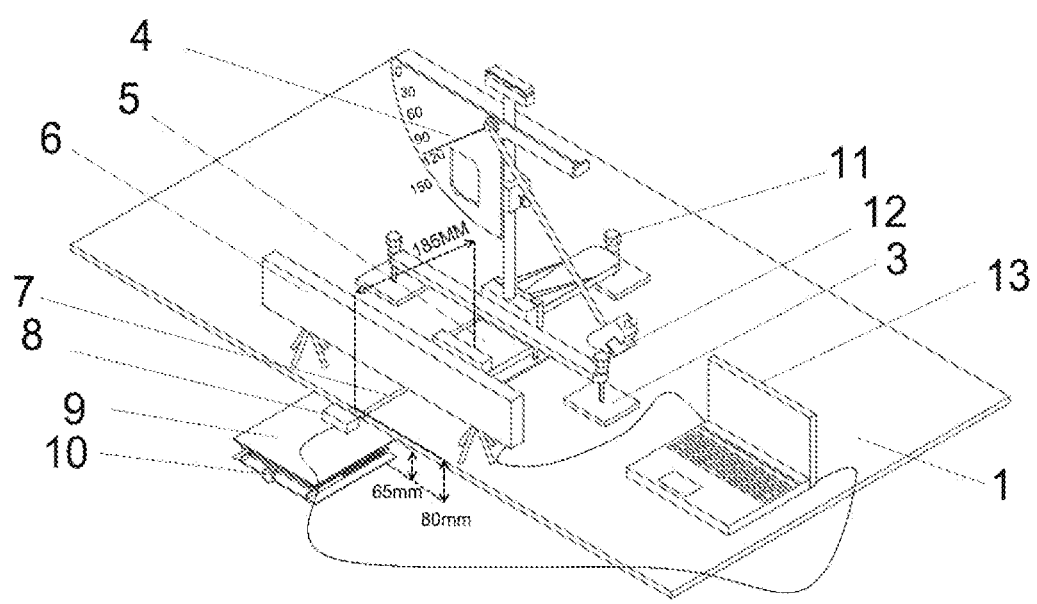
FIG. 2 is a schematic diagram of an anti-skid performance evaluation device in accordance with an embodiment of the present disclosure.

As shown in FIGS. 1-2, a pavement anti-skid performance evaluation device based on tire envelope feature is provided, which includes a base plate 1, a friction test piece 5, a camera 8, a fixing fixture 2 and a pendulum friction tester 4. The fixing fixture 2 is provided on the base plate 1. The friction test piece 5 is provided on the fixing fixture 2. The pendulum friction tester 4 is provided above the fixing fixture 2, and is connected to the base plate 1. The pendulum friction tester 4 is connected to the friction test piece 5. The camera 8 is connected to the base plate 1, and is located in front of the pendulum friction tester 4.

The evaluation device includes a fill light 6 provided on the base plate 1. The fill light 6 is located between the camera 8 and the pendulum friction tester 4.

The evaluation device further includes a lifting structure connected to the base plate 1. The lifting structure includes a lifting platform 9 and a lifting knob 10. The lifting platform 9 is connected to the base plate 1 through the lifting knob 10, and is configured to move up and down along a vertical direction of the base plate 1. The camera 8 is provided on the lifting platform 9.

The evaluation device further includes a computer 13 connected to the camera 8. The computer 13 is portable, and is configured to set an image acquisition mode and parameters, store acquired images and treat images. The computer 13 is installed with a MATLAB software. The image treatment is completed through MATLAB.

The evaluation device further includes pads 3 respectively provided on the base plate 1. A leveling knob 11 is provided on each of the pads 3, and is connected to the pendulum friction tester 4. During implementation, the number of the pads 3 is 3, and the pads 3 are each independently distributed on left, right and rear sides of the pendulum friction tester 4. The pendulum friction tester 4 is connected to the leveling knob 11, and a horizontal position of the pendulum friction tester 4 is adjusted through the leveling knob 11. The friction test piece 5 is provided on the fixing fixture 2 and fixedly locked by a fixing screw 7. A rubber slider 12 is provided on a pendulum of the pendulum friction tester 4. When the pendulum is swung, the rubber slider 12 is subject to friction movement on the friction test piece 5.

In this embodiment, a friction behavior between a tire and a pavement on a real road is simulated by a friction process of the pendulum friction tester 4 on the friction test piece 5. A surface of the friction test piece 5 can initially adopt 3D printed test pieces with different texture depths and texture shapes replace a real pavement surface. The friction test piece 5 is the pavement, and the rubber slider 12 is the tire. This is used to build a correlation model between an anti-skid evaluation index and the pavement anti-skid performance.

Figure 3:
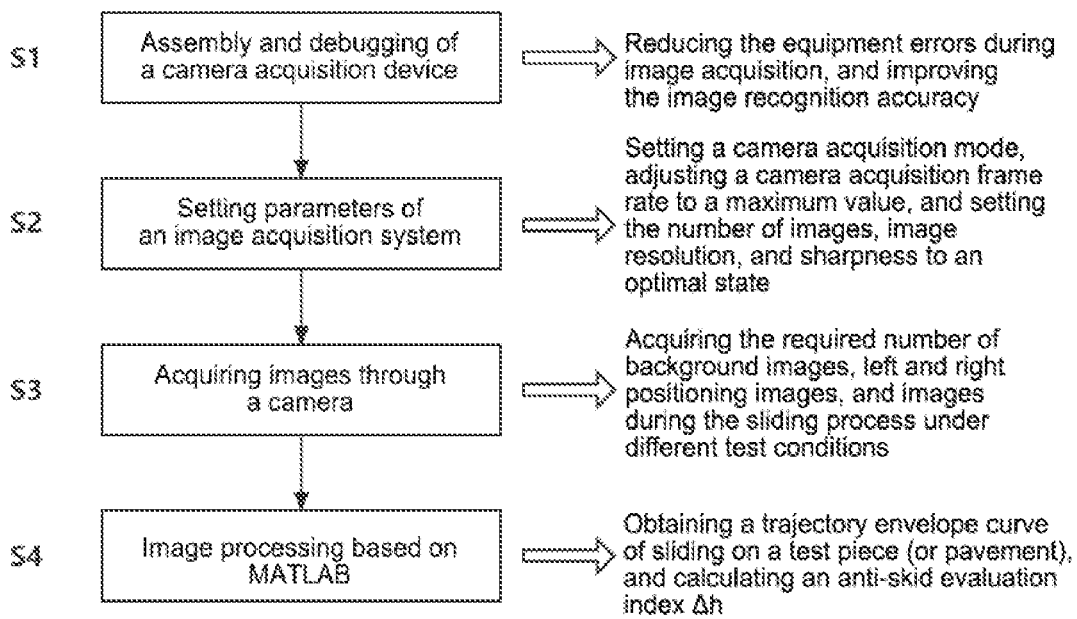
FIG. 3 is a flow chart of an anti-skid performance evaluation method in accordance with an embodiment of the present disclosure.

As shown in FIG. 3, a pavement anti-skid performance evaluation method based on envelope feature is provided, which specifically includes the following steps.

Step (1) Assembly and Debugging of Camera Acquisition Device

The device mainly includes the base plate 1, the camera 8, the pendulum friction tester 4, the fill light 6 and the computer 13. The base plate is configured to fix relative positions of the friction test piece 5 and the pendulum friction tester 4. The camera 8 is an industrial camera, the pendulum friction tester 4 is a BM-III type pendulum friction coefficient tester, and the fill light 6 is two rectangular LED light sources with adjustable brightness.

As shown in FIG. 2, the steps of assembling an image acquisition device are as follows. The pendulum friction tester 4 and a to-be-tested piece (the friction test piece 5) are placed at calibrated positions on the base plate 1, respectively. The fixing screw 7 is rotated to fixedly lock the friction test piece 5, and in the meantime, the pendulum of the pendulum friction tester 4 can be dropped just to a middle position of the friction test piece 5. Subsequently, the pendulum friction tester 4 is subjected to leveling, zeroing, and sliding length (126 mm) calibration through the leveling knob 11, and then the camera 8 is fixed on the lifting platform 9. The lifting knob 10 is adjusted such that a distance from a plane where the lifting platform 9 is located to a plane where the base plate 1 is located is 65 mm. Meanwhile, a height from a center of the camera 8 to a bottom plane of the camera 8 is 80 mm, and a distance from a front end of the camera 8 to an outer edge of the friction test piece 5 is adjusted to 185 mm. The fill light 6 is placed between the camera 8 and the friction test piece 5. Finally, the camera 8 is connected to the computer 13.

During the implementation, in order to improve image quality and reduce image noise, light-absorbing cloth is used to wrap an equipment area outside the friction test piece 5, and the black rubber slider 12 (i.e., sliding piece) on the pendulum friction tester 4 is marked with a high-brightness pigment.

Step (2) Setting of Image Acquisition System Parameters

The image acquisition software (SaveImage) is used to realize soft trigger mode acquisition of trajectories of the rubber slider 12, which includes setting image storage parameters and camera parameters.

The steps of setting the image storage parameters are as follows. A camera acquisition mode is adjusted to a soft trigger mode with 500 frames per trigger and 500 triggers per second, which is lasted for is and 300 images are saved for each trigger. A save address and a picture format are set, and an automatic save mode is selected.

The steps of setting camera parameters are as follows. An image resolution is set to 1280*1024, and then a camera exposure control is set in sequence. A manual exposure control is selected, an analog gain multiplier is set to 6 times, and an exposure time is set to 0.5 s. After the above settings are completed, a camera aperture and a focal length are adjusted through two knobs at a fore end of the camera 8 until an object image is clear, and then the acquisition of the trajectory images of the rubber slider can be started.

Step (3) Acquisition of Images Through the Camera

Before acquiring a sliding trajectory of the rubber slider 12 on the friction test piece 5, a blank background image and a left and right positioning images of the pendulum of the pendulum friction tester 4 should be collected as following steps.

Step (3.1) The pendulum is kept in a horizontal release position with a pointer close to the pendulum, and at this time, a soft trigger is performed once and the blank background image is saved.

Step (3.2) The pendulum is released such that an edge of the rubber slider 12 is just in contact with the friction test piece 5, and an end of a 126 mm ruler is aligned. The soft trigger is performed once, and a right positioning image is saved. Then, a lifting handle is lifted to allow the rubber slider 12 to be lifted upward, and in the meantime, another end of the 126 mm ruler is aligned. The soft trigger is performed once, and a left positioning image is saved.

Step (3.3) Under a condition that the friction test piece 5 is dry (if performed with the friction test piece 5 wet, the friction test piece 5 is evenly sprinkled with water), the pendulum is placed at the horizontal release position. A pendulum release switch is pressed, and the soft trigger is clicked simultaneously, such that the pendulum can be slid over the friction test piece 5, and a friction coefficient value of the friction test piece can be indicated through the pointer.

When the pendulum is swung back, a pendulum lever is caught with one hand, and the lifting handle is lifted with another hand such that the rubber slider 12 is raised. The pendulum is allowed to move to the right, and the switch is pressed, such that a pendulum length ring entered into the pendulum release switch. A pendulum needle is pivoted until close to a toggle tab.

The above operations are repeated for five measurements (if performed in wet conditions, water should be sprinkled each time), and the values are recorded each time. If the difference between the five values is not greater than three units (i.e., one and a half divisions of a dial), for example, the difference is greater than three units, the cause should be checked and the above operations should be repeated again until meeting specified requirements.

Step (4) Image Treatment Based on MATLAB

Figure 4:
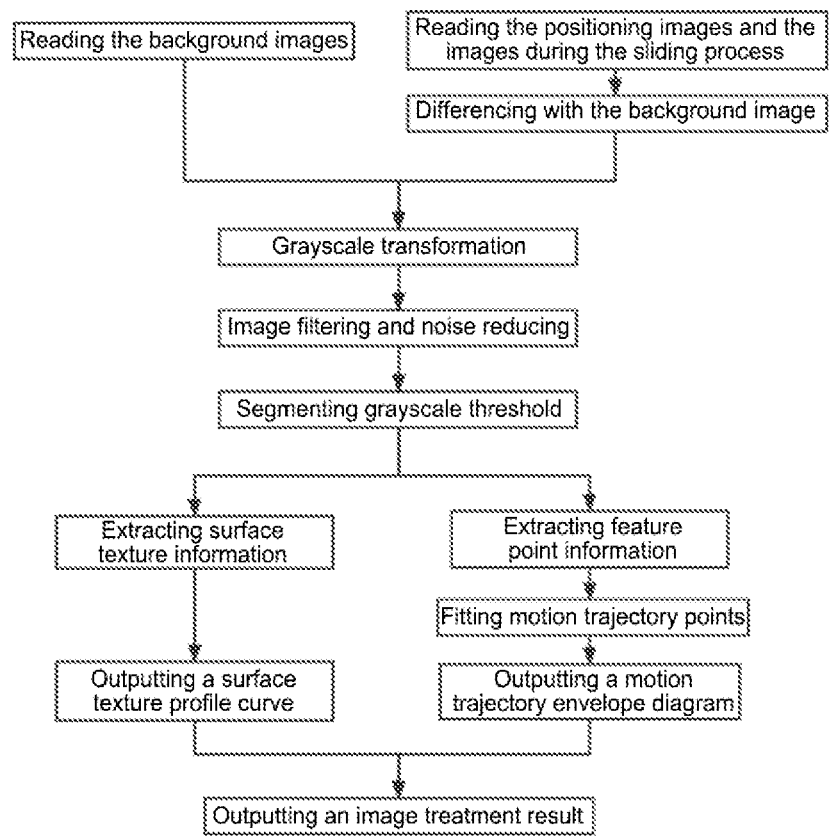
FIG. 4 shows steps of treating images based on MATLAB in accordance with an embodiment of the present disclosure.

In order to obtain a sliding envelope curve of the rubber slider 12 on the friction test piece 5 and a surface texture profile curve of the test piece, the blank background image, the left and right positioning images and images during the sliding process acquired in step (3) are adopted for identification according to the steps shown in FIG. 4.

Figure 5:
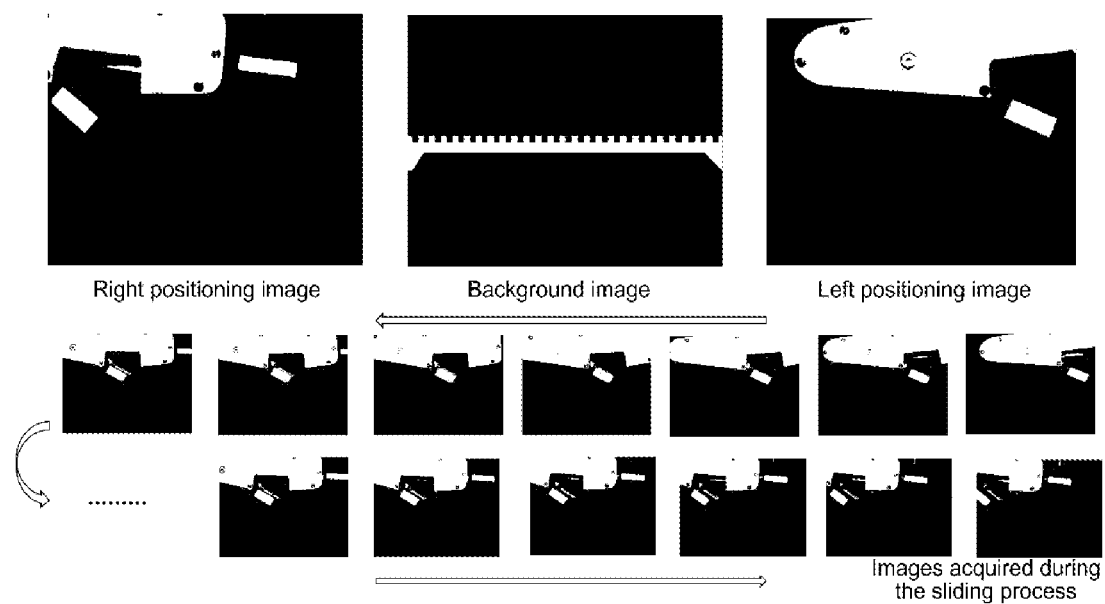
FIG. 5 shows a background image, left and right positioning images and images during a sliding process acquired in Embodiment 1 of the present disclosure.

Step (4.1) The blank background image is read and subjected to grayscale transformation, such that the blank background image is converted from an RGB image to a grayscale image. Image noise is removed through a filter denoising method. An appropriate threshold is selected to convert the blank background image into a black-white binary background image. Finally, surface texture profile edge information of the friction test piece 5 is extracted, and the surface texture profile curve of the friction test piece 5 is obtained, as shown in FIG. 5.

When treating the above image, the image is first converted into a grayscale image, and then is subjected to filter denoising, which adopts a median filtering denoising method in the prior art, thereby effectively removing salt and pepper noise in the grayscale image. Since there may be differences between each group of acquired images, during conversion, a threshold value is adjusted according to an actual situation of each of the images combined with conditions such as light intensity, so as to ensure that image texture edges after thresholding are clear. During implementation, the threshold value can be adjusted between 150-200.

Step (4.2) The left and right positioning images and the images during the sliding process are read and differenced with the blank background image in sequence, thereby retaining slider status information. Other portions of the images which affect recognition results are removed to obtain difference images. The difference images are converted into grayscale images, respectively, and subjected to image noise reduction and threshold segmentation to obtain corresponding black-white binary images. The left and right positioning images and the images during the sliding process after treated are shown in FIG. 5, which are subjected to the same process as in step (4.1).

Furthermore, lowest point information of a contact between the rubber slider 12 the surface of the friction test piece 5 is extracted from each of the images. Positions of left and right positioning points of the rubber slider 12 are recorded, and feature points (the lowest point information) during the sliding process are subjected to trajectory fitting. A fitting curve within a range of left and right positioning lines is used as a trajectory envelope curve of the rubber slider 12 sliding on the friction test piece 5.

Figure 6:
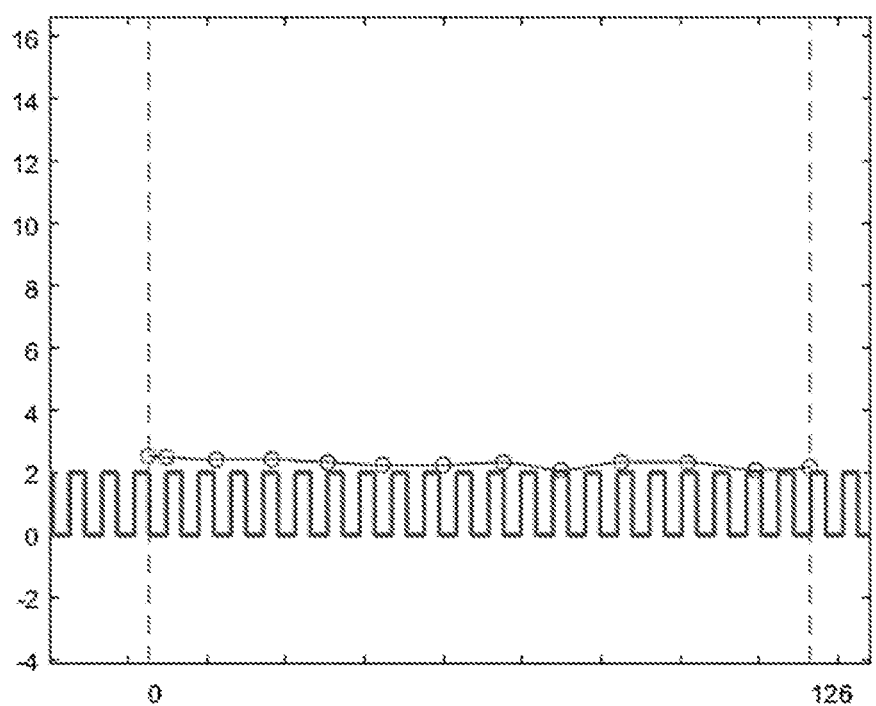
FIG. 6 shows an image output result in Embodiment 1 of the present disclosure.

Step (4.3) The surface texture profile curve obtained in step (4.1) is combined with the trajectory envelope curve of the rubber slider 12 sliding on the friction test piece 5 obtained in step (4.2) as a final image treatment result which needs to be output, as shown in FIG. 6.

In this embodiment, the surface texture profile curve can be rectangles with different heights, triangles, circles and other texture shapes, and the trajectory envelope curve is related to coordinates of each of the points in the collected images, and is obtained by applying a cubic spline curve interpolation function of MATLAB.

Step (4.4) A height difference ($\Delta h$) between an arithmetic mean value of the trajectory envelope curve and an arithmetic mean value of the surface texture profile curve is calculated. The anti-skid performance can be characterized by $\Delta h$, which reflects a change in a slider-test piece contact area under different conditions.

Table 1 shows a comparison of test results between the evaluation method in this application and a traditional evaluation method for a 3D printed friction test piece with a rectangular surface texture, a texture height of 2 mm and a texture spacing of 2-12 mm.

The traditional evaluation method for evaluating the pavement anti-skid performance is by means of a structural depth and a friction coefficient measured by the pendulum friction tester.

TABLE 1

Comparison of test results of the friction test piece and the rubber slider

| Surface texture shape | Texture height (mm) | Texture spacing (mm) | Texture depth (mm) Dry | Texture depth (mm) Wet | Friction coefficient (bpn) Dry | Friction coefficient (bpn) Wet | $\Delta h$ (mm) Dry | $\Delta h$ (mm) Wet |
|---|---|---|---|---|---|---|---|---|
| Rectangle | 2 | 2 | 0.92 | 0.92 | 100 | 55 | 2.343 | 2.761 |
|  | 2 | 4 | 1.33 | 1.33 | 99 | 69 | 3.711 | 4.012 |
|  | 2 | 6 | 1.51 | 1.51 | 100 | 81 | 3.938 | 4.202 |
|  | 2 | 8 | 1.61 | 1.61 | 105 | 96 | 4.283 | 4.554 |
|  | 2 | 10 | 1.68 | 1.68 | 115 | 105 | 4.408 | 4.636 |

It can be seen from Table 1 that when the structural depth is adopted by the traditional evaluation method to evaluate the pavement anti-skid performance, an impact of external environmental load conditions such as water on the anti-skid performance fails to be reflected. Although the friction coefficient and the evaluation index $\Delta h$ proposed by the present disclosure can reflect the changes in the anti-skid performance of the friction test piece under different environments well, the friction coefficient is only a simple mechanical result which cannot reflect the dynamic contact process between the sliding piece and the to-be-tested piece, and thus fails to be applied to the deep investigation of the source and spatial evolution of friction behavior.

In addition, it can also be seen from Table 1 that in the evaluation method of the present disclosure, when the texture spacing of the friction test piece is constantly increased, a rubber slider-friction test piece contact area is gradually decreased, and the anti-skid performance is accordingly decreased. The anti-skid performance of the friction test piece is better than that under wet conditions.

Since the magnitude of $\Delta h$ is related to a contact area between the sliding piece and the to-be-tested piece, the smaller a $\Delta h$ value, the larger the tire-pavement contact area, and the better the anti-skid performance; and on the contrary, the larger the $\Delta h$ value, the smaller the contact area between the sliding piece and the to-be-tested piece, and the worse the anti-skid performance.

Embodiment 2

In this embodiment, a camera 8 is installed at a bottom of a sideway force coefficient test vehicle to acquire motion images of a tire on a regular texture pavement. A tire envelope curve and a pavement texture curve are obtained, and a height difference Δh between an arithmetic mean value of the tire envelope curve and an arithmetic mean value of the pavement texture curve is calculated, so as to evaluate the anti-skid performance of a tire and a pavement.

Figure 7:
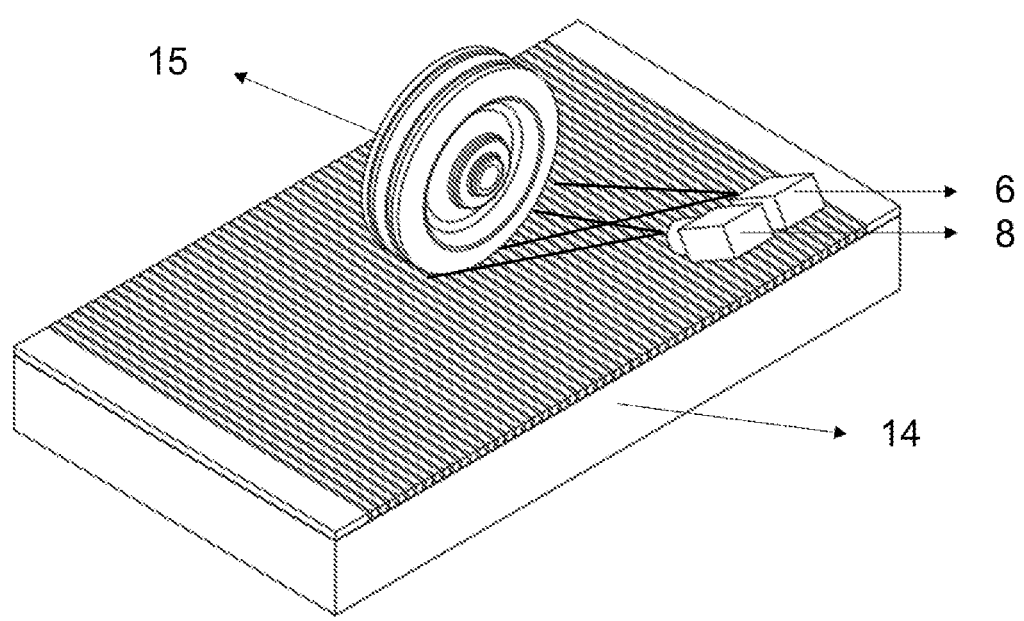
FIG. 7 schematically illustrates image acquisition in Embodiment 2 of the present disclosure.

An acquisition method provided herein is shown in FIG. 7. The sideway force coefficient test vehicle is a sideway force test vehicle. The camera 8 and a fill light 6 are fixedly installed on a bottom of the sideway force test vehicle, so as to acquire images of motion of the tire 15 on a regular cross-section pavement 14. The tire 15 is placed on a test wheel of the sideway force test vehicle.

A method for testing the anti-skid performance based on the sideway force coefficient test vehicle provided in this embodiment specifically includes the following steps.

Step (1) The camera 8 and the fill light 6 are fixedly installed on a bottom of a crossbeam of the sideway force test vehicle, ensuring that the camera 8 and the fill light 6 are installed at the same deflection angle and directly opposite to a side of the tire 15, i.e., a wheel hub side of the tire 15. A motion image of the tire 15 on the pavement 14 is acquired, and the camera 8 is electrically connected to a computer 13. A frame rate of the camera 8 is selected based on a test rate of the sideway force test vehicle.

Step (2) An image acquisition software is started and subjected to image storage setting and camera parameter setting in sequence.

The steps of image storage setting are as follows. A camera acquisition mode is adjusted to a soft trigger mode, the number of images saved in a single trigger is to 300, a saving address and an image format are selected, and an automatic saving mode is selected.

The camera parameters are set as follows. An image resolution is set to 1280*1024. Then, a camera exposure control is set, i.e., a manual exposure control is selected, an analog gain multiple is set to 6 times, and an exposure time is set to 0.5 s. A camera acquisition frame rate is set to reach a maximum value. After the above settings are completed, a camera aperture and a focal length are adjusted through two knobs at a fore end of the camera 8 until an object image is clear, and then the acquisition of a trajectory motion image of the tire on the pavement can be started.

Step (3) The sideway force test vehicle is controlled to travel at 50 km/h, and at this time, the frame rate of the camera 8 reaches 1500 fps. The sideway force test vehicle is raised to acquire a set of blank background images, i.e., the acquired images only contain information about the regular cross-section pavement 14, excluding the tires 15. Then, test wheels of the sideway force test vehicle are lowered, such that the tire 15 is in contact with the regular cross-section pavement 14, and motion images of motion of the tire 15 on the regular cross-section pavement 14 are started to be acquired.

Step (4) Acquisition of the Tire Envelope Curve and the Pavement Texture Curve

All of the acquired images are subjected to image tilt angle detection and image correction by applying image tilt correction algorithm of MATLAB, which is intended to transform images taken at tilt into images taken squarely at the same level.

The blank background images and the motion images after tilt correction are used to obtain the tire envelope curve and the pavement texture profile curve according to the following steps.

Step (4.1) The blank background images are read and subjected to grayscale transformation, such that the blank background images are respectively converted from RGB images to grayscale images. Image noise is removed through a filter denoising method, and an appropriate threshold is selected. The images are converted into black-white binary images, and then surface texture profile edge information of the pavement is extracted, so as to obtain the pavement texture profile curve.

Step (4.2) The motion images are read and respectively differenced with the blank background images, thereby retaining status information of the tire. Other portions of the images which affect a recognition result are removed. The images after differenced are converted into grayscale images and subjected to image denoising and threshold segmentation. Then, lowest point position information of the tire is extracted from each of the treated motion images, and lowest point of the tire in each of the motion images is subjected to trajectory fitting, so as to obtain a fitting curve as the trajectory envelope curve of motion of the tire on the regular cross-section pavement.

Step (5) Calculation of Anti-Skid Index and Evaluation of Anti-Skid Performance Based on Tire Envelope Feature A height difference Δh between an arithmetic mean value of the tire envelope curve and an arithmetic mean value of the pavement texture profile curve is calculated according to the pavement texture profile curve obtained in step (4.1) and the trajectory envelope curve obtained in step (4.2). The anti-skid performance can be characterized by Δh, which reflects a change in a tire-pavement contact area under different conditions.

When a load becomes larger, the envelope curve shifts downward, Δh becomes smaller, and the anti-skid performance becomes better. When increasing a speed, the envelope curve shifts upward, Δh becomes larger, and the skid resistance becomes worse. When there is water, pollutants, ice or snow on the pavement, the envelope curve shifts upward, Δh becomes larger, and the anti-skid performance becomes worse, which is consistent with an actual situation.

In summary, the smaller the Δh value, the larger the tire-pavement contact area, and the better the anti-skid performance, and the larger the Δh value, the smaller the tire-pavement contact area, and the worse the anti-skid performance.

The embodiments described above are merely illustrative of the present application, and are not intended to limit the scope of the present application. Without departing from the spirit of this application, various modifications and improvements made by those of ordinary skill in the art shall fall within the scope of the disclosure defined by the appended claims.

What is claimed is:

1. A pavement anti-skid performance evaluation method based on envelope feature, comprising:
   step (1) acquiring a surface profile image of a to-be-tested piece as a blank background image;
   step (2) acquiring a motion trajectory image of a sliding piece on the to-be-tested piece;
   step (3) subjecting the blank background image to grayscale transformation, filter denoising and binarization processing in sequence to obtain a black-white binary background image, and extracting edge pixel information of a surface texture profile of the to-be-tested piece from the black-white binary background image to obtain a surface texture profile curve of the to-be-tested piece;

step (4) differencing the motion trajectory image in step (2) with the blank background image in step (1) with status information of the to-be-tested piece retained to obtain a difference image, subjecting the difference image to grayscale transformation, noise reduction and threshold segmentation to obtain a plurality of motion images of the sliding piece on the to-be-tested piece, extracting lowest point information of the sliding piece from each of the plurality of motion images, and subjecting the lowest point information of the sliding piece in each of the plurality of motion images to trajectory fitting to obtain a fitting curve as a trajectory envelope curve of motion of the sliding piece on the to-be-tested piece; and step (5) calculating an arithmetic mean of the trajectory envelope curve in step (4) and an arithmetic mean of the surface texture profile curve in step (3), defining a height difference between the arithmetic mean of the trajectory envelope curve and the arithmetic mean of the surface texture profile curve as an anti-skid performance index $\Delta h$ of the to-be-tested piece, and evaluating an anti-skid performance between the sliding piece and the to-be-tested piece based on $\Delta h$.

2. The pavement anti-skid performance evaluation method of claim 1, wherein the steps (3)-(5) are all completed through Matrix Laboratory (MATLAB).

3. The pavement anti-skid performance evaluation method of claim 1, wherein the sliding piece is a rubber slider or a tire, and the to-be-tested piece is a pavement or a friction test piece.

4. The pavement anti-skid performance evaluation method of claim 3, wherein in step (5), the smaller a $\Delta h$ value, the better an anti-skid performance of the to-be-tested piece, and the larger the $\Delta h$ value, the worse the anti-skid performance of the to-be-tested piece.

5. A device for implementing the pavement anti-skid performance evaluation method of claim 4, comprising:
a base plate;
a friction test piece;
a rubber slider;
a camera;
a fixing fixture; and
a pendulum friction tester;
wherein the fixing fixture is provided on the base plate; the friction test piece is provided on the fixing fixture; the pendulum friction tester is provided above the fixing fixture, and is connected to the base plate; the rubber slider is provided on the pendulum friction tester, and is configured to slide on the friction test piece; and the camera is connected to the base plate, and is located in front of the pendulum friction tester.

6. The device of claim 5, further comprising:
a fill light provided on the base plate;
wherein the fill light is located between the camera and the pendulum friction tester.

7. The device of claim 6, further comprising:
a lifting structure connected to the base plate;
wherein the lifting structure comprises a lifting platform and a lifting knob; the lifting platform is connected to the base plate through the lifting knob, and is configured to move up and down along a vertical direction of the base plate; and the camera is provided on the lifting platform.

8. The device of claim 7, further comprising:
a computer connected to the camera.

9. The device of claim 8, further comprising:
a pad;
wherein the pad is provided on the base plate; and a leveling knob is provided on the pad, and is connected to the pendulum friction tester.

10. A device for implementing the pavement anti-skid performance evaluation method of claim 4, comprising:
a camera;
a fill light;
a tire;
a pavement; and
a sideway force coefficient test vehicle;
wherein the sideway force coefficient test vehicle is provided on the pavement; the camera, the fill light and the tire are provided on the sideway force coefficient test vehicle; and the camera and the fill light are both directly opposite to a wheel hub side of the tire.

\* \* \* \* \*